(12) United States Patent
Derrien et al.

(10) Patent No.: US 8,574,477 B2
(45) Date of Patent: Nov. 5, 2013

(54) METHOD FOR APPLYING A FLUID TO END WALLS OF THERMOPLASTIC CONTAINERS

(75) Inventors: Mikael Derrien, Octeville-sur-Mer (FR); Guy Feuilloley, Octeville-sur-Mer (FR); Yann Pernel, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 129 days.

(21) Appl. No.: 13/056,551

(22) PCT Filed: Jul. 30, 2009

(86) PCT No.: PCT/FR2009/051530
§ 371 (c)(1),
(2), (4) Date: Jan. 28, 2011

(87) PCT Pub. No.: WO2010/012957
PCT Pub. Date: Feb. 4, 2010

(65) Prior Publication Data
US 2011/0169188 A1  Jul. 14, 2011

(30) Foreign Application Priority Data

Jul. 31, 2008 (FR) .................................. 08 55282

(51) Int. Cl.
*B29C 71/00* (2006.01)
*B65G 25/00* (2006.01)
*B65G 35/00* (2006.01)

(52) U.S. Cl.
USPC ........ 264/237; 264/348; 264/523; 198/803.8; 198/803.3; 198/803.9

(58) Field of Classification Search
None
See application file for complete search history.

(56) References Cited

U.S. PATENT DOCUMENTS 3,340,569 A * 9/1967 Hagen ............................ 425/532
3,668,288 A * 6/1972 Takahashi ..................... 264/46.1
3,764,284 A * 10/1973 Rowe .............................. 65/60.7
3,923,936 A    12/1975 Davis et al.
7,748,518 B2   7/2010 Hollriegl et al.

FOREIGN PATENT DOCUMENTS

GB    1 375 041 A    11/1974
JP    2002-1803    * 1/2002

* cited by examiner

*Primary Examiner* — Edmund H. Lee
(74) *Attorney, Agent, or Firm* — Sughrue Mion, PLLC

(57) ABSTRACT

The invention relates to the application of a fluid, especially a liquid, to a hot end wall (2) of at least one thermoplastic container (1). For this purpose, a spongy mass (4) impregnated with the fluid is brought into contact with the end wall (2) of said at least one container (1), said spongy mass being held in contact with the end wall (2) for a predetermined time. Application in particular to the cooling of the hot end walls of containers leaving a blow molding or stretch-blow molding unit.

11 Claims, 13 Drawing Sheets

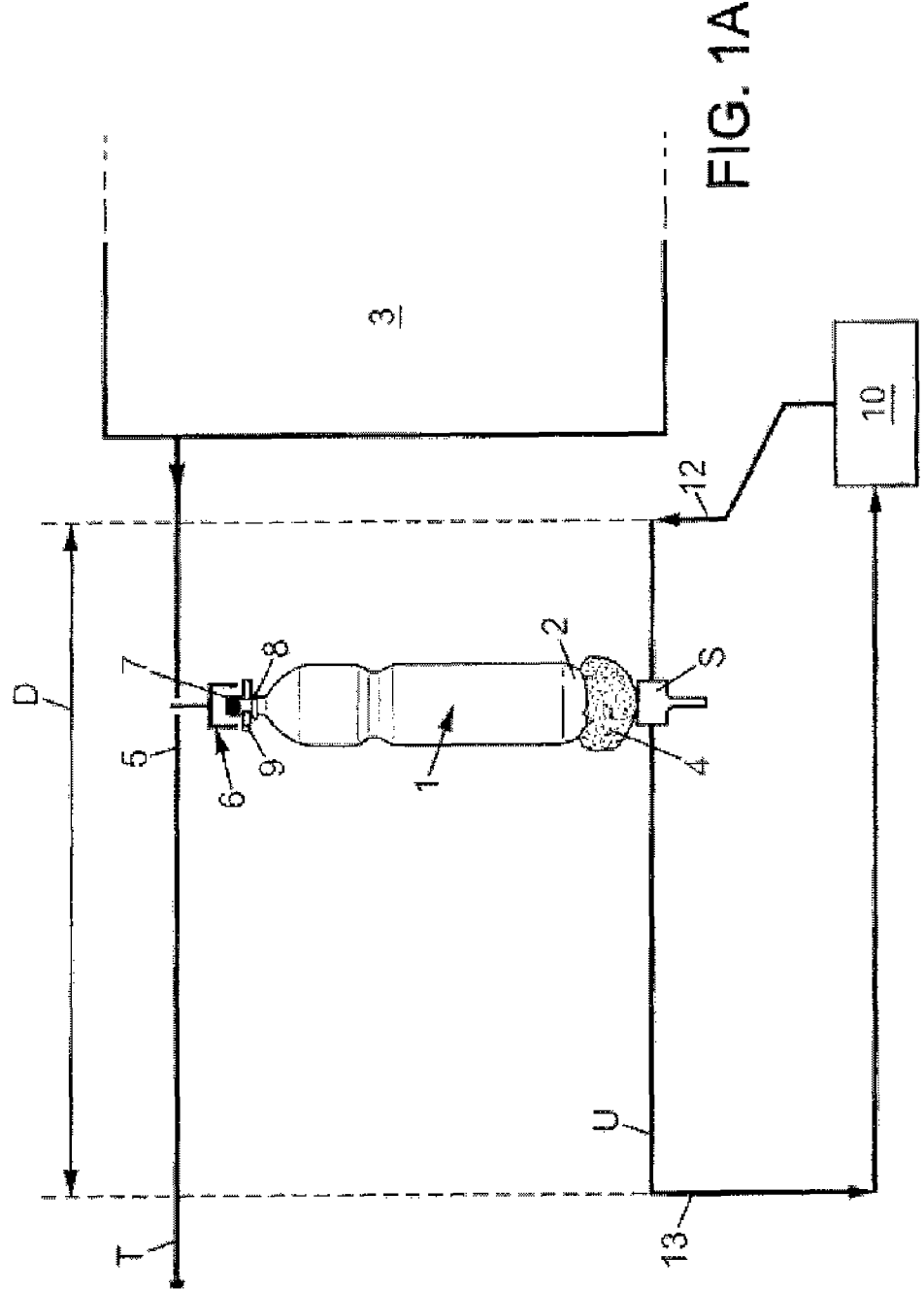

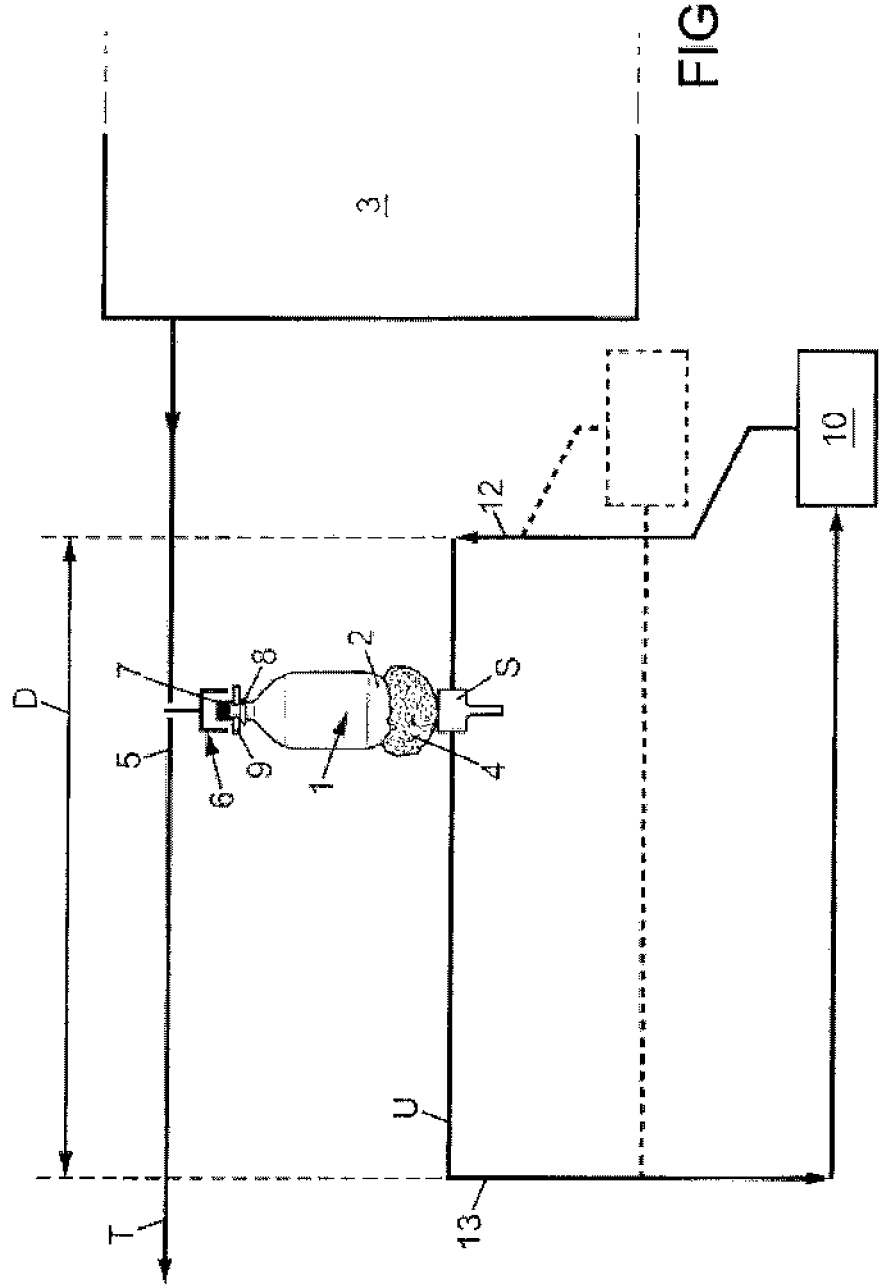

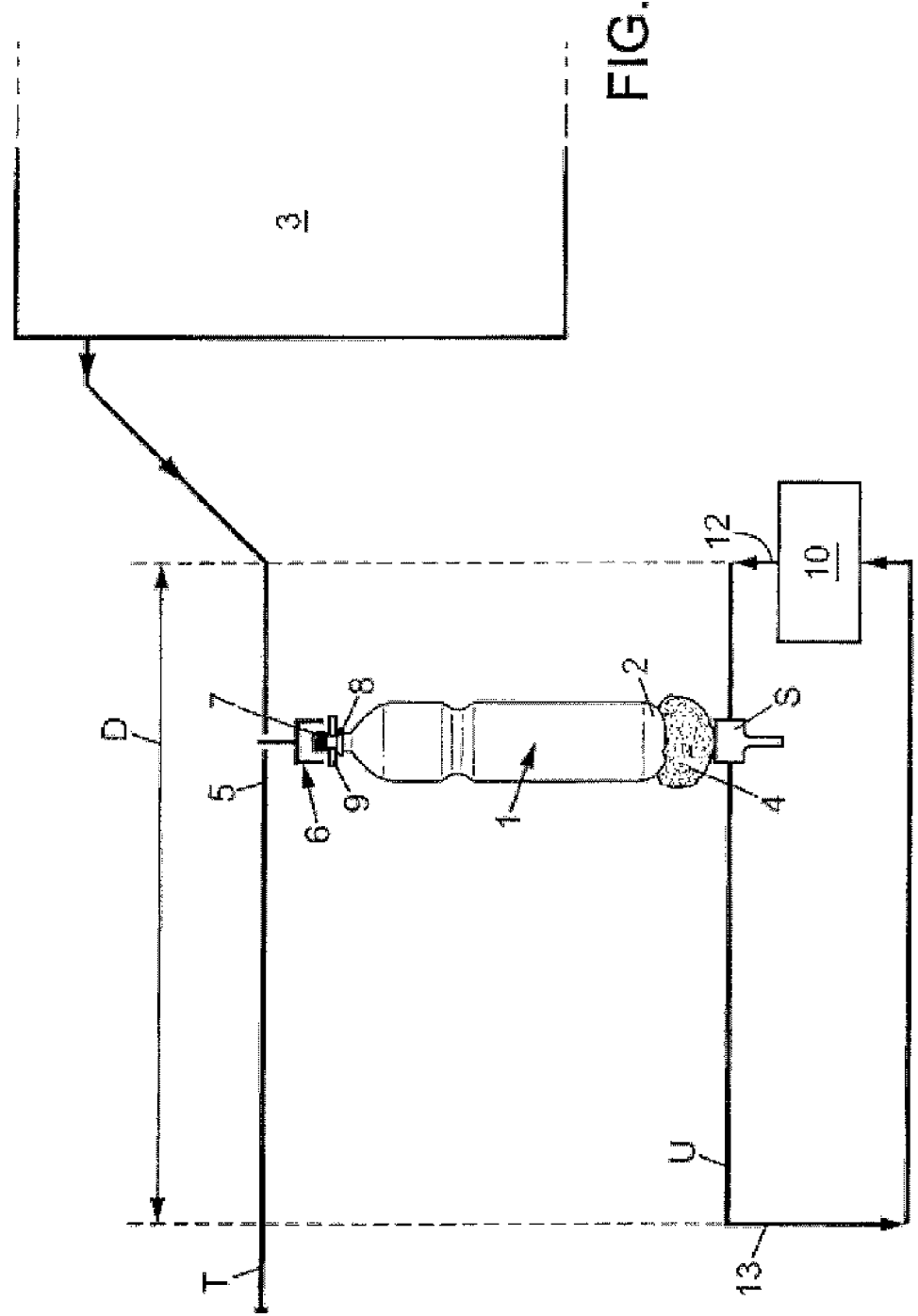

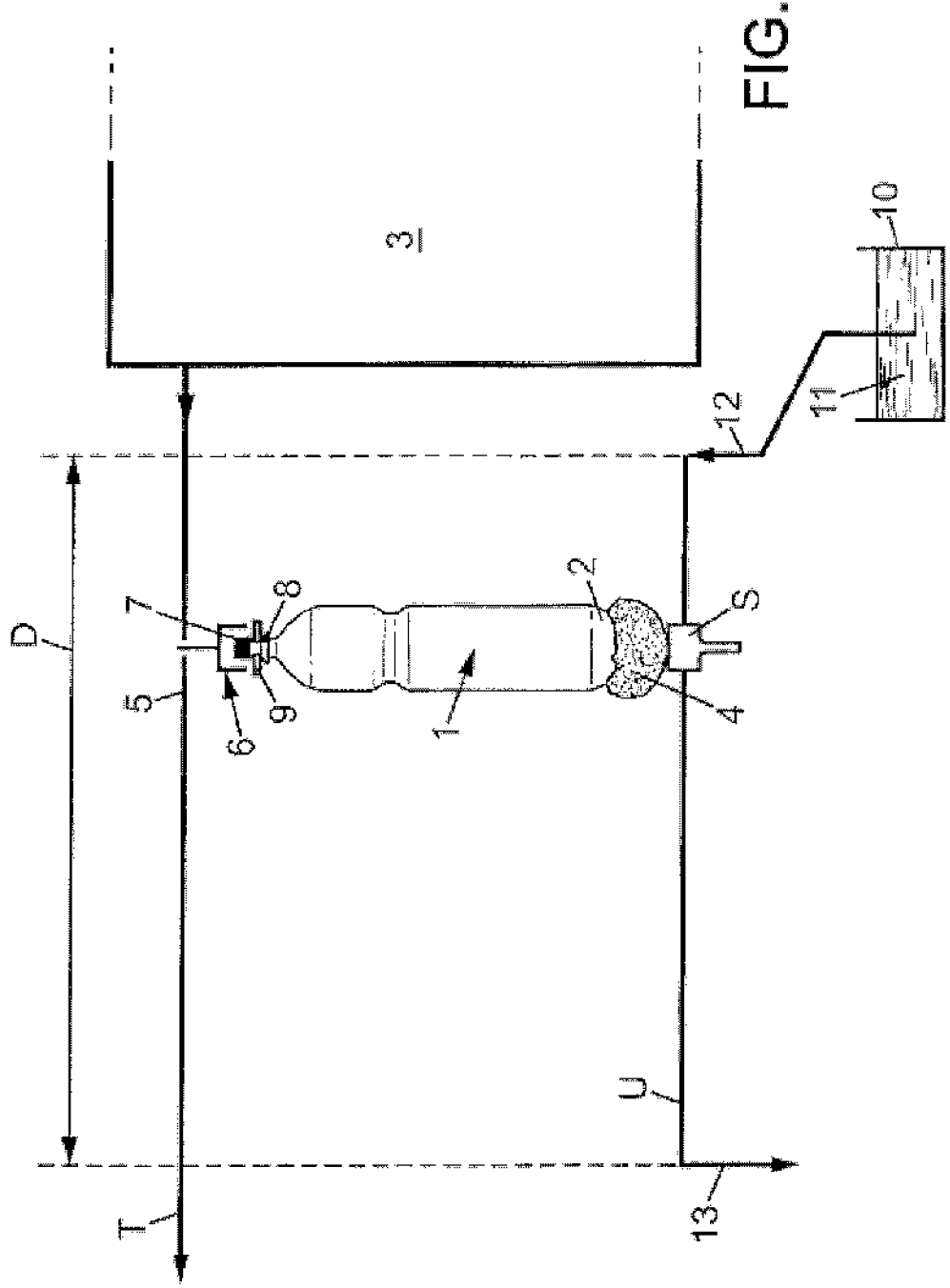

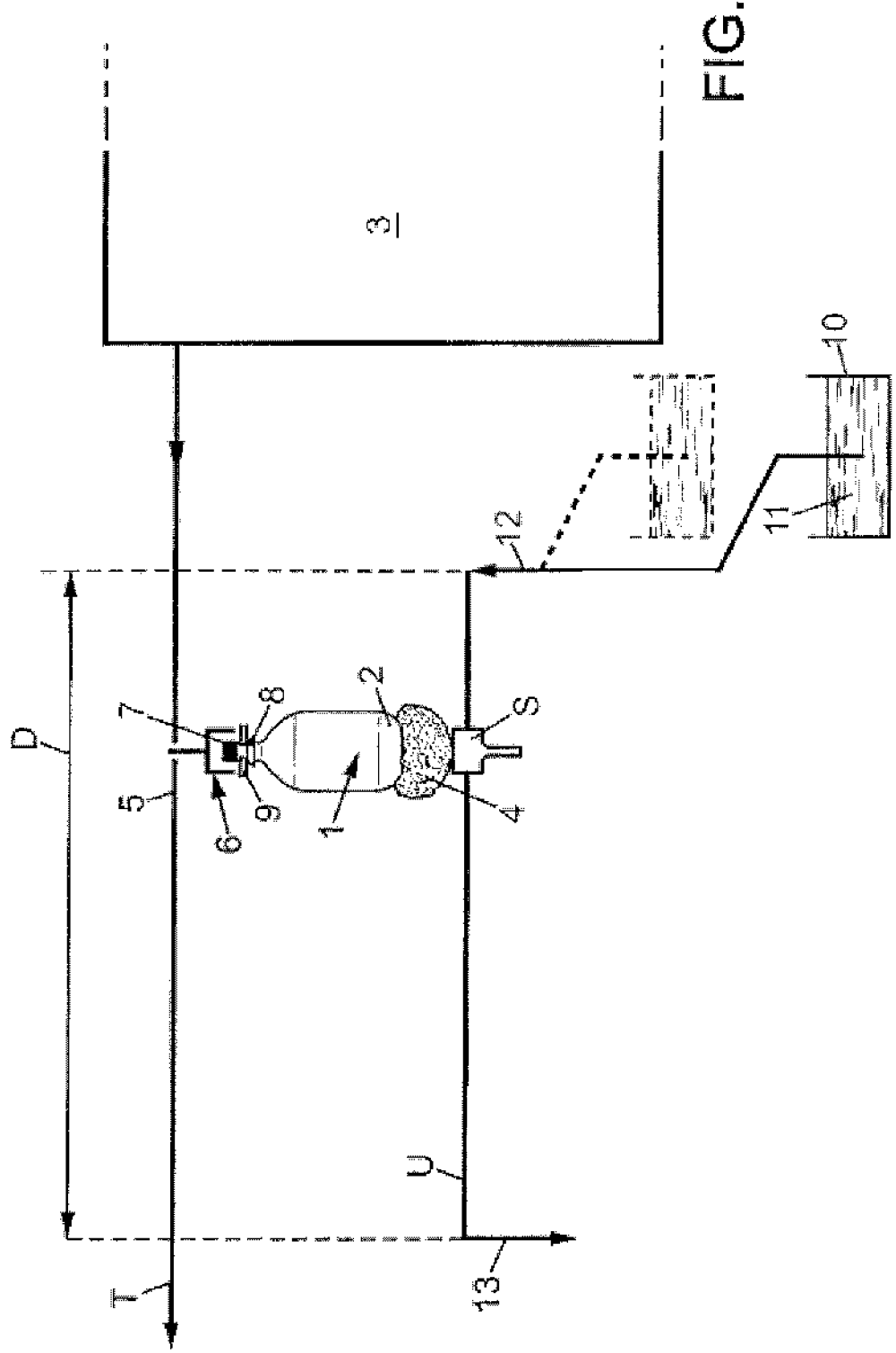

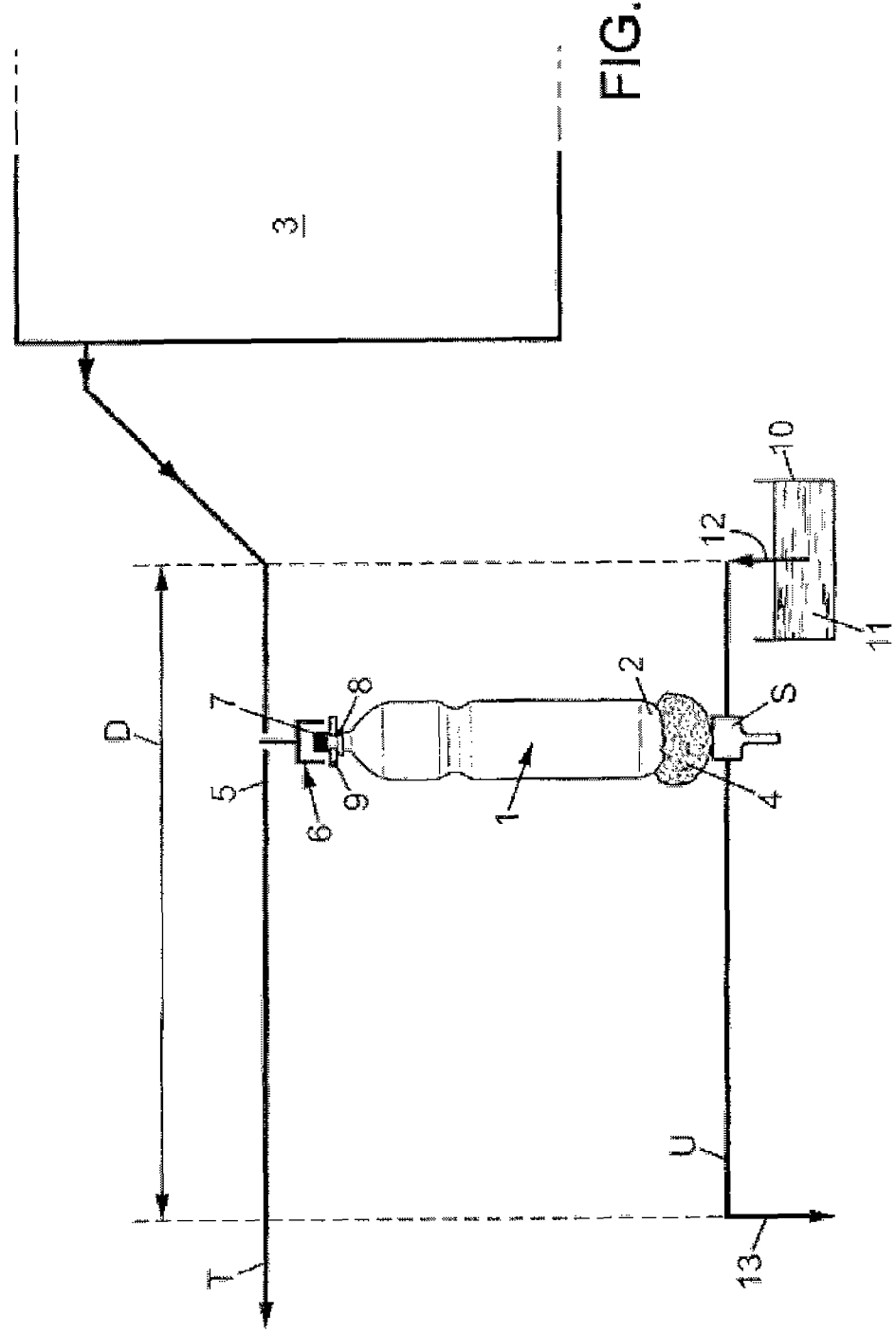

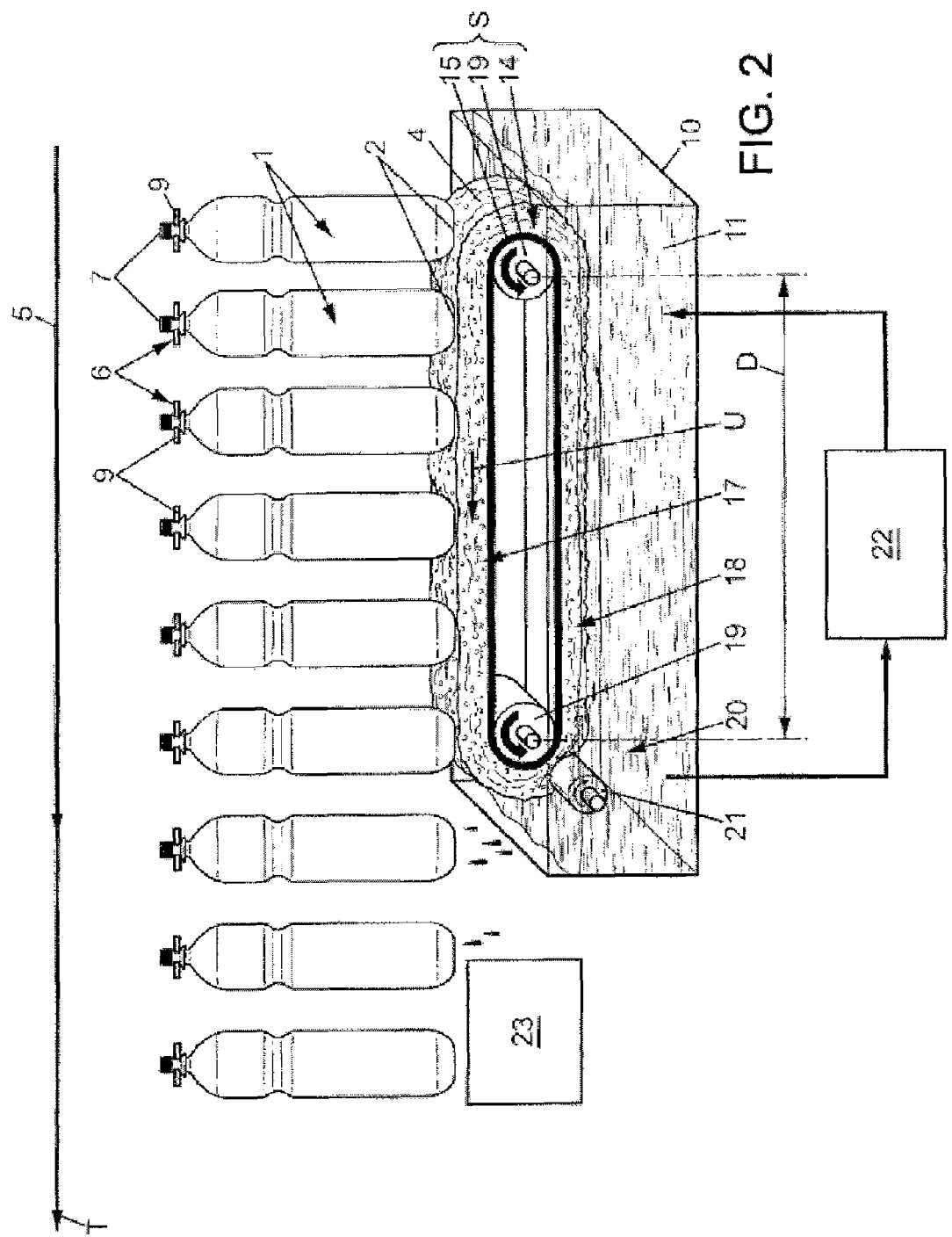

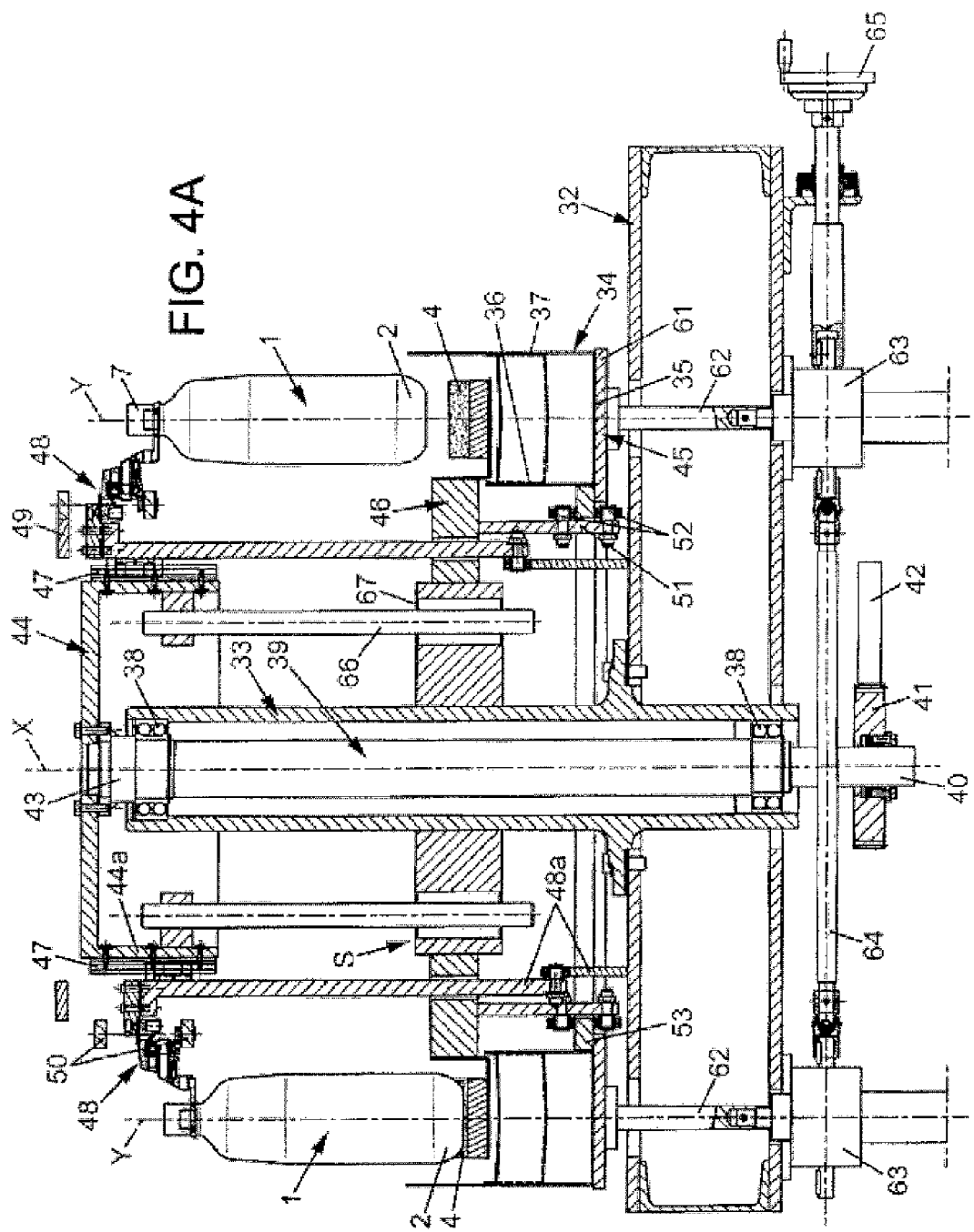

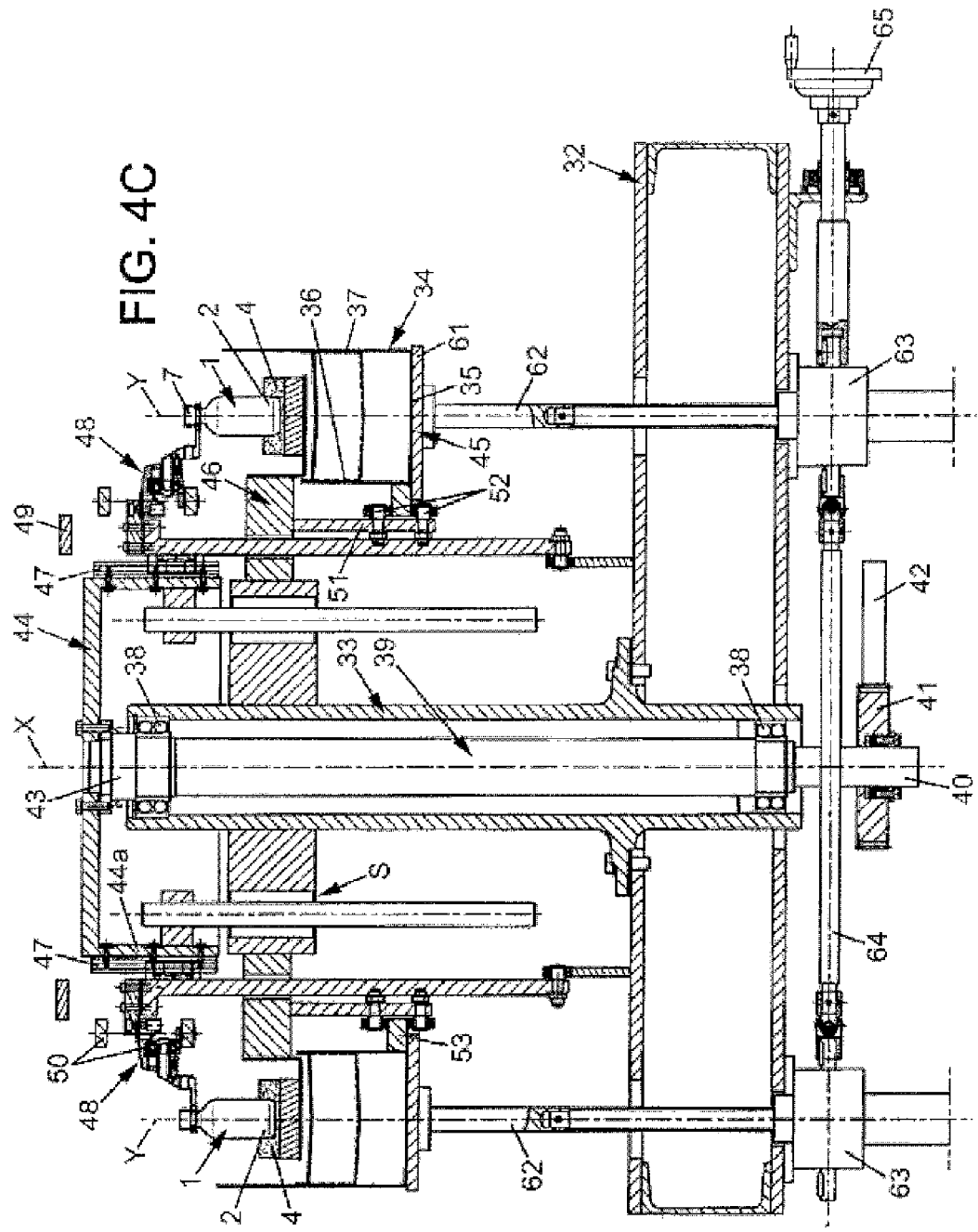

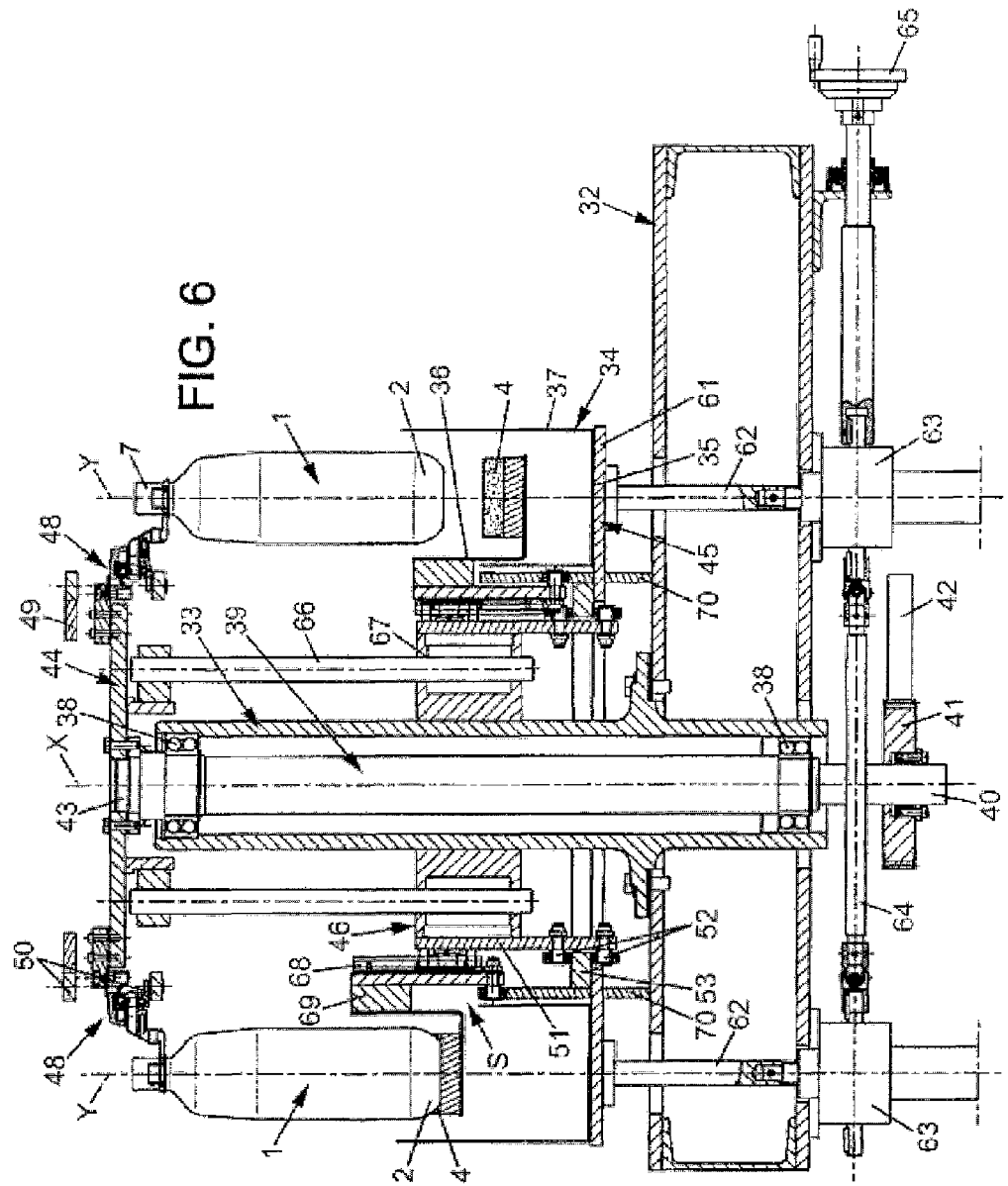

METHOD FOR APPLYING A FLUID TO END WALLS OF THERMOPLASTIC CONTAINERS

FIELD OF THE INVENTION

The invention generally relates to the field of manufacturing thermoplastic containers, of a material such as PET, by blow-molding or stretch-blow molding hot preforms into molds. The invention particularly relates to the application of a fluid to the end walls of thermoplastic containers, particularly but not exclusively for the cooling of hot end walls of thermoplastic containers leaving a blow molding or stretch-blow molding unit.

BACKGROUND OF THE INVENTION

The end wall is the part of thermoplastic containers that is the most difficult to treat and that requires the most attention during the manufacturing process.

The end wall is also the thickest part of the containers, at least in parts: typically the thickness of the end wall can be between one and twenty times the thickness of the wall of the container body at some points at least. As a result, the end wall accumulates a large amount of heat during the heating step performed prior to the molding step. This heat is still present when the finished container is removed from the mold.

The hot end wall is mechanically very fragile, because the still very hot thermoplastic material can become deformed from its own weight and/or from the residual stresses associated with the blowing process. Having a perfectly shaped container end wall ensures container stability when it is placed on a flat surface, and any deformation of the end wall compromises this stability and results in a commercially unusable container.

It is therefore of great importance that the material that forms the end wall be cooled as quickly as possible when the finished container leaves the mold, so that it is stabilized in the required shape imparted by the mold. In any event it is desirable for the shape of the end wall to be stable, and therefore for the temperature be lowered, when the container reaches the next processing station.

In the past, the end walls of containers leaving a molding unit could be cooled naturally by the ambient atmosphere as they traveled the path leading to the next station (for example a filling machine), when this path was sufficiently long (e.g. a few dozen seconds).

Some systems have also sprayed a mist of gaseous fluid (usually air) or a liquid (usually water) in the form of a possibly cooled mist, onto the end walls of the containers filing out of the molding system, in order to accelerate the cooling of the end walls. However, this type of arrangement complicates the structural design of already highly encumbered systems and also increases manufacturing and maintenance costs. Furthermore, coolant sprays can cause pollution (appearance of bacteria, etc.), both from the blowing system and the final containers, as well as disturbances in adjacent parts of the system. For this reason, avoiding such arrangements is preferred.

Finally and most importantly, the operators of thermoplastic container production facilities require ever-increasing operating speeds, and rates on the order of 80,000 containers per hour are currently anticipated. In addition, the need for increasingly compact systems in order to fit into smaller spaces is leading to closer proximity of the various processing stations, for example between the blow-molding system and the filling system that follows it. This results in a considerable shortening of the container transit time. For example, the time for transferring containers between the blow-molding system and the filling system may be reduced to only a few seconds. It is no longer possible under such conditions for the end walls of containers leaving the molding unit to be cooled under the conditions which have applied in the past.

Independently of what has just been described concerning the cooling of hot end walls of thermoplastic containers leaving the molding unit, and in the general context of thermoplastic container manufacturing, some production processes may require the application of a product in a fluid form, particularly a liquid, to the end wall of thermoplastic containers, not to lower the temperature as described above, but rather to raise the temperature or to modify the surface finish of the container end wall. In at least some cases, the surface finish of the container end wall may be modified by applying an appropriate fluid, particularly a liquid, to the outer face of said end wall. Examples include depositing a layer to protect against corrosive chemicals or coloring the outer face of the end walls for decorative purposes.

A system for manufacturing containers by molding is known from document GB 1 375 041. The system comprises three primary stations. At the first station, the containers are molded in cavities arranged in a rotating wheel. Outside this wheel and near its peripheral edge is a means for cooling the containers in the cavities. This cooling means comprises a rotating roller, to which is attached a spongy mass which dips into a container of cooling liquid.

Such a cooling means may result in container deformations.

SUMMARY OF THE INVENTION

The object of the invention is a means (method and system) for applying a fluid onto the end walls of containers, particularly but not exclusively in order to cool rapidly the end walls of containers leaving a molding unit, while preserving their shape or their surface condition, and doing so under acceptable cost and space conditions for facilities operating at very high production rates and under technical conditions that result in no change or disturbance to upstream and downstream processes.

A first aspect of the invention proposes a method for applying a fluid onto the end wall of at least one container of thermoplastic material, wherein:

a spongy mass saturated with the fluid is brought into contact with the end wall of said at least one container, and the spongy mass is held in contact with said end wall for a predetermined period, the container being conveyed along a predetermined path.

The method of the invention is noteworthy in that the spongy mass is advanced at the same speed as the container along a path substantially parallel to that of the container, while being in contact with the container end wall during said predetermined period.

The method of the invention thus ensures a synchronized motion of the spongy mass and the container end wall, which offers the advantage of the spongy mass being immobile relative to the surface to be cooled. The surface to be cooled is therefore not damaged by a movement of the spongy mass in contact with it.

In one embodiment capable of processing a large number of containers advancing one after another along said predetermined path which is substantially rectilinear:

the spongy mass is in the form of an endless strip comprising at least one working side extending substantially parallel to said predetermined path of the containers and moved synchronously in rotation with the movement speed of the succession of containers, the containers are moved so that their respective end walls are brought into contact with said working side of the endless strip formed by the spongy mass, and the endless strip formed by the spongy mass is saturated with fresh fluid when it leaves its contact with the container end walls.

The term "fresh fluid" is understood to mean a fluid which possesses its original required properties either because it has not yet been used (for example it has just been supplied) or because after use it is recycled in any appropriate manner in order to restore its original properties.

In another preferred embodiment capable of processing a large number of containers filing one after another along said predetermined path which is substantially an arc of a circle of a predetermined radius, and which in addition is relatively compact so that it can easily be installed in a container treatment system:

a plurality of spongy masses are provided which are respectively positioned underneath said containers and advance one after another, along a substantially circular path having a radius substantially equal to said predetermined radius and extending substantially parallel and substantially coaxially to said predetermined path of the containers, said spongy masses being moved synchronously in rotation with said containers and underneath the respective end walls of said containers, when the containers arrive at the start of the predetermined path, the containers and the spongy masses are brought closer together so that the end walls are in contact with the respective spongy masses, when the containers arrive at the end of the predetermined path, the containers and the respective spongy masses are moved apart, and when the spongy masses are no longer in contact with the container end walls they are reloaded with fresh fluid, said reloading with fresh fluid occurring during the angular travel of the spongy masses between the end of the travel of the containers along the predetermined path and the start of the travel of the containers along the predetermined path.

At least one characteristic of the fresh fluid can advantageously be regulated when necessary, particularly the temperature.

To improve the effectiveness of the method by reloading the spongy mass with the maximum amount of fresh product, the fluid can be a liquid and, when no longer in contact with the container end wall, the spongy mass is wrung out and resaturated with fresh liquid before coming back in contact with an end wall of another container.

To economize the amount of products used and to avoid, or at least reduce, pollution to the facility when the fluid is a liquid, it is desirable to recover the liquid that escapes when the spongy mass or masses is pressed against the container end walls and when it is wrung out, and to return the recovered liquid to the reserve of fresh liquid after any applicable processing.

Advantageously, to accelerate the availability of the containers, for immediate filling for example, it is desirable that after the fluid is applied to the container end wall and said spongy mass is moved away from said end wall, the surface of said end wall is at least partially dried.

The means proposed by the invention allow treating container end walls by applying a fluid, particularly a liquid, onto said end walls under conditions compatible with the high production rates currently required by manufacturers and/or packagers. It is possible to rapidly modify the temperature of the end wall of at least one container of thermoplastic material, by holding said spongy mass saturated with a heat transfer fluid, particularly a liquid, in contact with the end wall of said at least one container for a predetermined period.

This aspect of the method of the invention seems to have a particularly attractive application in rapidly cooling the hot end wall of at least one container of thermoplastic material when it leaves a blow molding or stretch-blow molding unit. In such a method, the spongy mass placed in contact with the end wall of said at least one container is saturated with a heat transfer fluid, particularly a liquid, at a temperature lower than that of the end walls (coolant), and maintained in contact with said end wall for a predetermined period. Said fluid can commonly be a liquid such as water, possibly with a specific product added such as one that can reduce its surface tension to accelerate evaporation. Rapid and efficient cooling of container end walls becomes possible, and therefore a rapid stabilization of said end walls into their final shape, because of the possibility of supplying cooling fluid in a quantity that is impossible to obtain with the means currently used (blowing a gas or spraying a liquid), with the very significant added advantage of the possibility of an industrial use in high output container production facilities.

A second aspect of the invention proposes a system for applying a fluid onto the end wall of at least one container of thermoplastic material, in order to implement the method that has just been described, comprising:

at least one spongy mass suitable for saturating with said fluid, and support means suitable for maintaining said fluid-saturated spongy mass in contact with said end wall of at least one container for a predetermined period, and conveying means suitable for conveying a multiplicity of containers one after the other along a predetermined path.

In the invention, the system comprises a driving means functionally associated with said support means so that the latter are moved synchronously with the conveying means such that said at least one spongy mass remains in contact with the end wall of a container, the length of said predetermined path and/or the movement speed of the containers and the spongy mass being established to obtain said predetermined period of maintaining the spongy mass in contact with the end wall of the container.

In a possible embodiment of such a system, enabling the processing of a large number of rapidly advancing containers:

the fluid is a liquid, the liquid replenishment means comprises a tank filled with fresh liquid, the conveying means moves along a predetermined and substantially linear path, the spongy mass is in the form of an endless strip comprising at least one working side which is elongated and extends substantially rectilinearly and substantially parallel to the path traveled by the end walls of the containers moved by the conveying means, and which is vertically positioned so that the end walls of the containers press into the spongy mass saturated with liquid, and said endless strip comprises a portion, separate from said working side, arranged to advance through said tank filled with fresh liquid.

In another embodiment, which is currently preferred due to the fact that not only is it compatible with the constraints of industrial mass production but it is also more compact and more easily installed, the conveying means for the containers moves in a substantially circular motion and conveys the containers along a substantially arc-shaped predetermined path between a point of exit and point of entry for the containers, and the system comprises:

a plurality of spongy masses supported one after the other, a plurality of spongy mass supports arranged in a substantially circular manner and made to rotate on a circular path substantially parallel and coaxial to the path traveled by the end walls of the containers, driving means suitable for mutually moving said container conveying means and/or said spongy mass support means such that the container end walls are in contact with the respective spongy masses for at least a portion of said arc-shaped predetermined path traveled by the containers, and means of reloading the spongy masses with fluid, arranged in the portion of said circular path located between the container point of exit and point of entry on said predetermined path.

In such a system, said driving means can be designed to control a substantially vertical displacement of the containers, to lower them downstream from said point of entry in order to bring their end walls in contact with the corresponding spongy masses, and to raise them upstream from said point of exit in order to move their end walls away from the corresponding spongy masses. Or, in one variant, it is also possible for said driving means to control a substantially vertical displacement of the spongy masses, to raise them downstream from said point of entry in order to bring them in contact with the corresponding container end walls, and to lower them upstream from said point of exit in order to move them away from the corresponding container end walls.

In a practical and exemplary embodiment, it is advantageous for the system to comprise a substantially annular trough placed under the path of the spongy masses, for collecting the liquid likely to drip from the spongy masses in order to conserve product.

To increase the operating efficiency of the system of the invention, it is desirable for the spongy mass to be reloaded with the maximum amount of fresh fluid. For this purpose, the fluid being a liquid, the system can comprise wringing means for wringing out the spongy mass after its separation from the container end wall, and the liquid replenishment means is placed downstream from said wringing means to reload the spongy mass with fresh liquid. In an exemplary embodiment, said spongy mass wringing means can comprise at least one roller against which the advancing spongy masses are pressed. In another practical and exemplary embodiment which is currently preferred, the means for loading the spongy mass with fresh liquid can comprise at least one line that sprays fresh fluid onto the spongy masses.

Lastly, when necessary and/or of interest, the system can comprise various supplemental arrangements to improve or facilitate operation. For example, the system can comprise a means for regulating the temperature and/or regenerating the fresh fluid.

A system of the invention can have particular applications, although not exclusively, in rapidly modifying the temperature of the end wall of at least one thermoplastic container, said fluid then being a heat transfer fluid. In particular, such a system seems of special interest for rapidly cooling the hot end wall of at least one thermoplastic container leaving a blow molding or stretch-blow molding unit, with the fluid saturating said at least one spongy mass being a heat transfer fluid at a temperature lower than that of the thermoplastic material constituting said end wall.

BRIEF DESCRIPTION OF THE DRAWINGS

The invention will be better understood by reading the following detailed description of certain embodiments provided solely as non-limiting examples. This description refers to the attached drawings, in which:

FIGS. 1A, 1B and 1C are highly schematic side views illustrating the essential points of the method of the invention for three possible variants, FIGS. 1D, 1E, and 1F are highly schematic views respectively analogous to FIGS. 1A, 1B and 1C, FIG. 2 is a schematic side view of a possible embodiment of a system implementing the method of the invention industrially, FIGS. 4A and 4B are schematic representations, the first a diametric view and the second a top view, of a preferred embodiment of a rotating system arranged according to the invention, FIG. 4C is a representation of the system shown in FIG. 4A, in another position during operation, FIG. 6 is a schematic representation of a diametric view of another preferred embodiment of a rotating system arranged according to the invention.

DETAILED DESCRIPTION OF THE INVENTION

Figure 3:
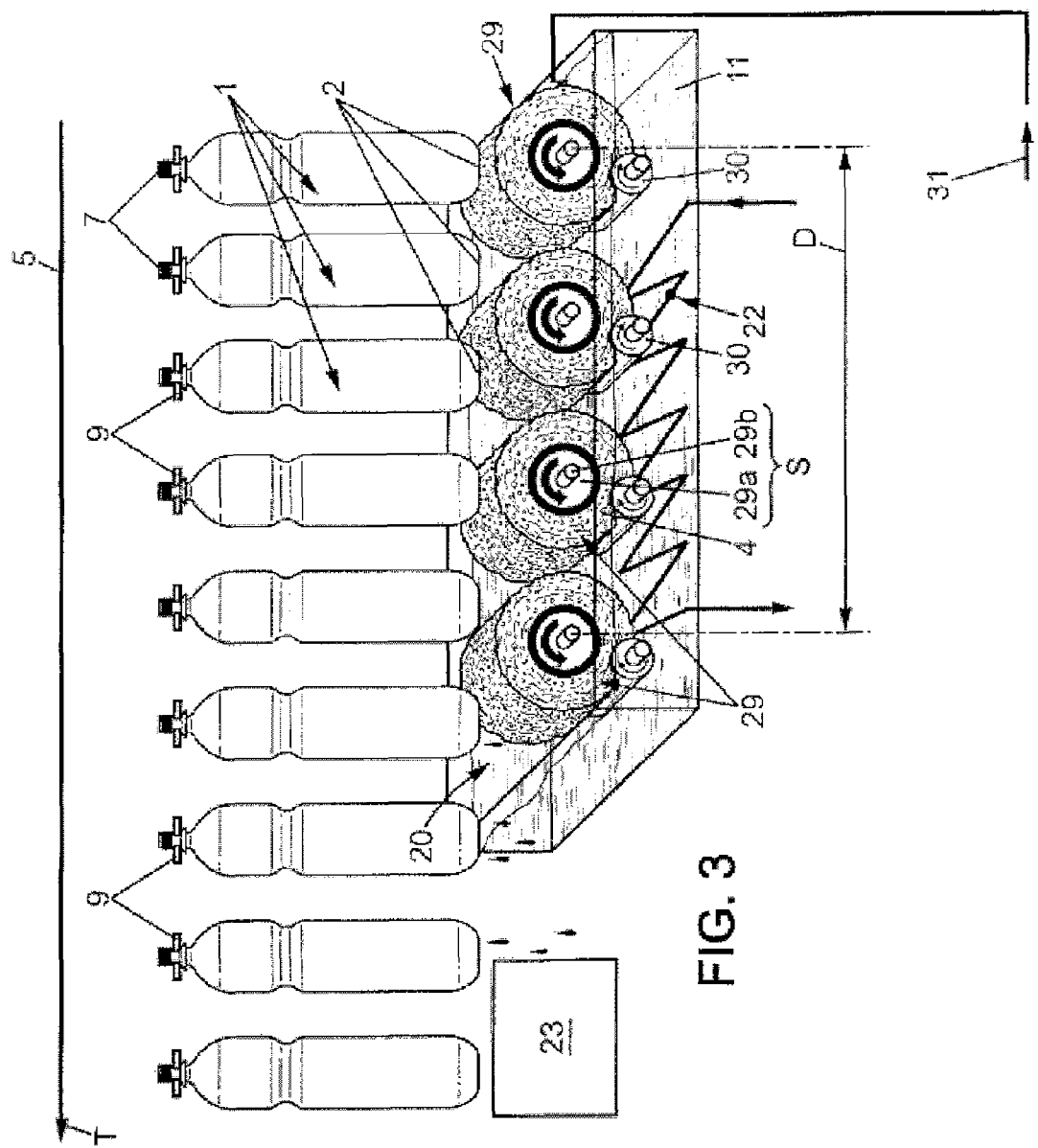
FIG. 3 is a schematic side view of another possible embodiment of a system implementing the method of the invention industrially.

FIG. 1A shows a highly schematic illustration of a method for applying a fluid to the end wall 2 of at least one container 1, particularly a bottle, of a thermoplastic material such as PET. In the invention, a spongy mass 4 saturated with said fluid is brought into contact with the end wall 2 of said at least one container 1, and said spongy mass 4 saturated with said fluid is held in contact with the end wall 2 by means of an appropriate support S for a predetermined period. In an industrial implementation of the method of the invention, the container 1 is conveyed along a predetermined path T (indicated by the arrow T), under the control of the conveying means denoted as 5 in FIG. 1A. It is assumed in the representation in FIG. 1A that the container 1 is supported by a clamping unit 6 comprising clamps 9 around the neck 7 of the container 1, above a flange 8 and between said flange and a thread on said neck 7 for securing a cap, and that said clamping unit 6 is itself supported by the conveying means 5. To simplify the representation, although this is not technically related to the invention, the method of the invention is illustrated in FIG. 1A as being implemented in a substantially rectilinear portion of the path T.

The spongy mass 4 is advanced at substantially the same speed as the container 1 along a path U (indicated in the diagram by the arrow U) of limited length D, substantially parallel to the path T of the container 1, simultaneously with its being maintained in contact with the end wall 2 of the container 1 during said predetermined period.

It should be pointed out that to maintain the spongy mass 4 in contact with the end wall of the container 1, force must be exerted against the end wall 2 of the container, substantially along the axis of said container, meaning substantially vertical from bottom to top in the configuration shown in FIG. 1A, for containers conveyed in a substantially vertical position with the neck upwards. As a result, in spite of the presence of the flange 8, it is necessary for the clamping unit 6 to grasp the neck 7 of the container 1 with positive force in order to secure the container vertically.

In the schematic representation shown in FIG. 1A, it is assumed that the spongy mass 4 was at least partially saturated with fresh fluid having the desired characteristics, at a particular location 10, for example within an enclosure (indicated as a box in FIG. 1A). Once saturated with fresh fluid in any appropriate manner, for which examples will be provided below, the spongy mass 4 and the end wall 2 of the container 1 are brought into contact with each other once they are in alignment with each other: in this example, the spongy mass 4 is raised out of the enclosure 10 (arrow 12), then applied against the end wall 2 of the container 1 once they are in alignment.

The spongy mass 4 then accompanies said end wall 2 as the container 1 travels along a given portion D of said path T, which corresponds, in relation to the travel speed of the container 1, to a predetermined contact time that should result in obtaining the desired effect on said end wall. At the end of said given portion of the path T, the spongy mass is moved away from the end wall 2 (arrow 13), while the container 1 conveyed by the conveying means 5 continues its course. The fluid in the spongy mass 4 may have at least partially disappeared (for example presence or appearance of a liquid phase which has dripped off) and may possibly have lost all or some of its characteristics in contact with the end wall 2, and the spongy mass 4 can then be returned to its starting point near the enclosure 10 where it is again reloaded with fresh fluid, awaiting the arrival of another container 1.

In the example illustrated in FIG. 1A, it will be noted that the conveying means 5 are represented as conveying the containers 1 along a path T at a substantially constant level, while it is the spongy mass 4 which is raised in order to be placed against the end wall 2 of the successive containers 1. In addition, the containers are assumed to have a relatively large height (for example bottles of 1.5 or 2 liters, to give an idea).

In FIG. 1B, the same system is represented for handling containers 1 of a lesser height (for example 0.5 liters, to give an idea), which requires providing a height adjustment for the spongy mass 4 support means and therefore for its path U.

However, in this case, the height to which the spongy mass 4 is raised from the enclosure 10 is such that the dripping liquid, when there is such, particularly when the fluid is a liquid, has a high risk of causing significant splattering and the facility will rapidly become dirtied. In another variant, this disadvantage is avoided by providing a height adjustment for the enclosure 10 as indicated by the dotted lines in FIG. 1B, so that it can be positioned relative to the height of the containers 1 and the vertical portion of the displacement of the spongy mass 4 can be reduced to a minimum.

It is also possible to resort to a reverse arrangement, illustrated schematically in FIG. 1C, in which the spongy mass, once it has left the enclosure 10, is moved along the path U at a substantially constant level while it is the successive containers 1 that are lowered, along a curvilinear path T, to come into contact with the spongy mass 4.

Although the general aspects which have just been described can be implemented with a fluid that is a gas, the simplest and most effective implementation of the invention seems to consist of a fluid that is a liquid. This is the example illustrated in FIGS. 1D to 1F (which are respectively analogous to FIGS. 1A to 1C above), in which the enclosure 10 may be in the form of a tank, also denoted 10, which contains a liquid 11. During the cycle, the spongy mass 4 is for example immersed in the tank 10, then removed from it and placed in contact with the end wall 2 of a container, then finally returned to the tank 10 to be reloaded with liquid 11.

Due to the fact that this is a particularly interesting application of the invention, although it is understood that said application is not exclusive and that the aspects of the invention could be implemented for other purposes such as heating container end walls or treating the surface of said end walls (changing the appearance, applying paint, etc.), in the examples shown in FIGS. 1A-1C and 1D-1F, the invention is assumed to be specifically implemented for applying a fluid, particularly a liquid, appropriate for cooling the hot end wall of containers leaving the molding unit.

Thus the method as illustrated in FIGS. 1A-1C and 1D-1F is assumed to be intended for applying a liquid to the end wall 2 of at least one recipient 1, particularly a bottle, of thermoplastic material such as PET, which is leaving a blow molding or stretch-blow molding unit 3 (3 denotes a blow mold or stretch-blow mold, or a blow molding or stretch-blow molding unit, particularly a rotary type which can contain multiple molds). For practical and economic reasons, the heat transfer fluid can be a cooling liquid such as water, but if necessary it can be any fluid, particularly any liquid, with an appropriate heat transfer coefficient, maintained at a temperature lower than that of the component material of the end wall 2, and particularly as low as desired.

When the fluid is a liquid, to facilitate reloading the spongy mass 4 with liquid and to ensure that it absorbs a larger amount of new liquid, it is advantageous, after it leaves contact with the end wall 2 of the container, to wring out the spongy mass 4 and resaturate it with fresh liquid before it comes back into contact with an end wall of another container (not shown in FIGS. 1D-1F).

Considering the temperature change that the fluid may undergo, particularly the change caused by plunging the spongy mass 4 into the fresh cooling liquid 11 contained in the tank 10, it may be of interest to provide heat regulation for the fluid (particularly the liquid 11 in the tank 10), in order to maintain the fluid at a predetermined temperature and ensure a more effective treatment of consecutive containers.

Still for the purposes of maintaining optimum effectiveness of the treatment, the fluid may be regenerated either continuously or sequentially, particularly the liquid in the tank 10.

To avoid dispersion of the liquid (condensation of gaseous fluid, liquid fluid), particularly from cooling, in the downstream portion of the facility and to allow each container 1 to be immediately available for a subsequent processing step (for example a labeling step), it may be desirable that after the end wall 2 of the container 1 is treated (cooled for example) by implementing the method of the invention as described above, another wrung-out spongy mass is brought into contact with the end wall 2 of the container in order to eliminate from said end wall 2 at least a part, and preferably most, of the liquid (for example cooling liquid) still present on its surface (not shown in FIG. 1).

A specific product for obtaining a particular effect can also be added to the fluid, particularly a product for limiting bacterial growth.

The rest of the description will present various practical embodiments of the invention, particularly for the case where the fluid used is a liquid, because it is in such case that the invention seems to have its most common applications.

Regarding FIG. 2, a practical embodiment of a system for cooling the end walls 2 of containers 1 by applying a cooling liquid to the end walls of containers will now be described, intended for an industrial use of the method of the invention, particularly in a high-output container production facility. In FIG. 2, for simplification, the blow mold or stretch-blow mold (or the blow molding or stretch-blow molding unit) 3 is no longer represented, and the same numerical references are used to denote the units or parts identical to those in FIGS. 1D-1F.

In such a system, the conveying means 5 is able to move a multiplicity of containers 1 one after another along said predetermined path T. Although the conveying means can be of any type, it must, as explained above, be designed to maintain each container 1 in place against the axial force the container is subjected to when the spongy mass 4 comes into contact with its end wall 2. In FIG. 2, only the clamps 9 mentioned above are schematically represented in order to simplify the drawing and render it more legible.

In this embodiment, the spongy mass is in the form of an endless strip denoted by the reference 14. The endless strip 14 can, for example, comprise an inner band 15 of a material (or an assembly of materials) sufficiently rigid to act as a substrate able to support an outer band consisting of a spongy material (an open-cell foam for example) which constitutes the actual spongy mass 4. The material constituting said inner band 15 must also be sufficiently flexible to be able to wind around the guide wheels of a driving mechanism.

Thus, said endless strip 14 comprises at least one working side 17:
  which is elongated and extends substantially rectilinearly and substantially parallel to the path T followed by the end walls 2 of the containers 1 conveyed by the conveying means 5, and
  which is vertically positioned so that the end walls 2 of the containers are pressed into the spongy mass 4.

In addition, the endless strip 14 is installed so that it is functionally linked to the tank 10 of cooling liquid 11 and comprises a portion, separate from said working side 17, which passes through the tank 10 filled with cooling liquid.

Although there are other possible arrangements which can be used where necessary, the simplest solution requiring the least space seems to consist of the spongy mass being in the form of an endless strip 14 with two working sides 17, 18 superimposed and substantially parallel to each other, and the endless strip 14 winds around two wheels 19 having horizontal axes, of which at least one is a drive wheel advancing the endless strip at a speed synchronized with that of the conveying means 5, as shown in FIG. 2. The endless strip 14 can be vertically arranged so that the two working sides 17, 18 are one above the other and then it is the upper side 17 which is saturated with cooling liquid and the lower side 18 which at least partially passes through the tank 10 of cooling liquid 11.

The axial distance between the two wheels 19 then substantially represents the distance D described above.

Together, the two wheels 19 and the aforementioned band 15 constitute said support means S for the spongy mass 4.

The system also comprises a wringing means 20 approximately positioned between the upper 17 and lower 18 sides of the endless strip 14, at its downstream end. As shown in FIG. 2, the wringing means 20 may simply consist of one (or possibly more) rigid rollers 21 arranged to compress the spongy mass 4. In other words, the wringing roller 21 is next to the downstream wheel 19 and the distance between the axes of the wringing roller 21 and said wheel 19 is less than the sum of their respective diameters. The wringing roller 21 can be placed above the level of the liquid 11 contained in the tank 10 so that the spongy mass 4 is wrung out when it is above the level of the liquid 11, and only the reheated liquid wrung out from the spongy mass 4 falls into the tank 10. However, preferably the wringing roller 21 can be placed below the level of the liquid 11 contained in the tank 10 so that the spongy mass 4 is wrung out when it is already immersed in the liquid 11: not only is the reheated liquid removed from the spongy mass 4, but also, as the spongy mass leaves contact with the wringing means, it resumes its shape which facilitates the pumping in of fresh liquid. It is the latter arrangement which is illustrated in FIG. 2.

Of course, the system can advantageously be arranged to have a heat regulation means able to maintain the liquid 11 contained in the tank 10 at a desired temperature, in order to compensate for the added heat due to the heated liquid wrung from the spongy mass 4. Said heat regulation means may be designed, as shown in FIG. 2, as an external unit that pumps liquid out of the tank 10, then reinjects it after thermally processing it; but a heat regulation means can also be envisaged within the body of liquid 11 inside the tank 10.

It is also possible to provide for continuous or sequential regeneration of the liquid 11 contained in the tank 10. To do this, it is possible to perform such regeneration outside the tank 10 by pumping liquid out of the tank, then reinjecting the regenerated liquid into the tank after processing, or by performing this regeneration within the tank 10. It is possible to have a functional coupling of the heat treatment unit and the regeneration unit, whether outside or inside the tank 10.

After it leaves the spongy mass 4, the surface of the end wall 2 of each container 1 may retain varying amounts of cooling liquid, which can interfere with an immediate use of the container, for example when it is promptly routed to a filling station, or these traces of liquid may pollute the surrounding area downstream. To avoid these disadvantages, it is desirable to provide, downstream from the area of activity of the spongy mass saturated with cooling liquid, a drying means 23 for at least partially drying the end walls 2 of the containers 1; said drying means 23 is indicated as a box in FIG. 2. The drying means 23 may be of any type appropriate for removing at least part of, and preferably most of, the liquid phase present on the container end walls.

In FIG. 3, another possible embodiment of a system for cooling the end walls 2 of containers 1 is illustrated, using the same numerical references as in FIG. 2 to denote identical units or parts.

The system in FIG. 3 differs from the one in FIG. 2 by the fact that instead of an endless strip arrangement, there is a succession of moistening rollers 29 placed side by side, substantially rectilinearly and substantially parallel to the path T followed by the end walls 2 of the containers 1 conveyed by the conveying means 5; the axes of said moistening rollers 29 are substantially perpendicular to said path T. Each moistening roller 29 can comprise a central rigid part incorporating a hub 29a mounted on an axle 29b, and the hub can rotate freely or, preferably, can be rotated by a driving means (not shown) which for example acts on the axle 29b. Each moistening roller 29 also comprises an external portion surrounding the hub 29a and constituted of a spongy material. It is this external portion which constitutes the actual spongy mass 4 described above.

The moistening rollers 29 are vertically positioned so that on top they are in contact with and press against the container end walls 2, and on the bottom they dip into the tank 10 filled with fresh cooling liquid 11.

In each roller 29, the hub 29a and the axle 29b constitute said support means S for the spongy mass 4.

Each moistening roller 29 is functionally associated with a wringing means advantageously comprising a rigid wringing roller 30 as described above.

The distance D cited above corresponds here to approximately the distance between the axes of the moistening rollers 29 at the two ends.

Otherwise the system in FIG. 3 is arranged in the same manner as the one in FIG. 2. To better illustrate the above description, the representation has been altered:

- to show the heat regulation unit 22 (and/or the liquid regeneration unit) installed inside the tank 10; said unit can be arranged in various ways and can implement various techniques,
- to show a supply 31 of supplemental liquid added to compensate for losses.

The embodiment in FIG. 2 has the advantage of a close and continuous contact of the spongy mass with the end walls 2 of the containers 1 for the entire distance D; another advantage lies in the fact that the containers are only subjected to one shock, as they come into contact with the spongy mass; however, a disadvantage lies in the fact that the liquid saturating the spongy mass is progressively heated as it advances along the path. The embodiment in FIG. 3 has the disadvantage of a series of shocks as the containers come in contact with the successive spongy masses, which requires very firm support for the containers; however, this embodiment offers the advantage of each container end wall coming into contact with fresh liquid at each roller, ensuring more effective cooling; this means that the distance D can be smaller than in the embodiment in FIG. 2, either in order to achieve a given cooling temperature, or to achieve a lower cooling temperature for a given distance D; in addition, it is easier to adapt the length of the distance D to the specific user requirements, by adjusting the number of moistening rollers accordingly.

Although the two embodiments just described with reference to FIGS. 2 and 3 have the advantage of a relatively simple structure, they also have the disadvantage that the system is of a substantial length, requiring a relatively large floor space, which means a higher installation cost.

As a result, at least for some applications, it seems wiser to utilize a preferred embodiment of a rotating type of system capable of the same technical performance but more compact and occupying a smaller floor space.

Figure 4B:
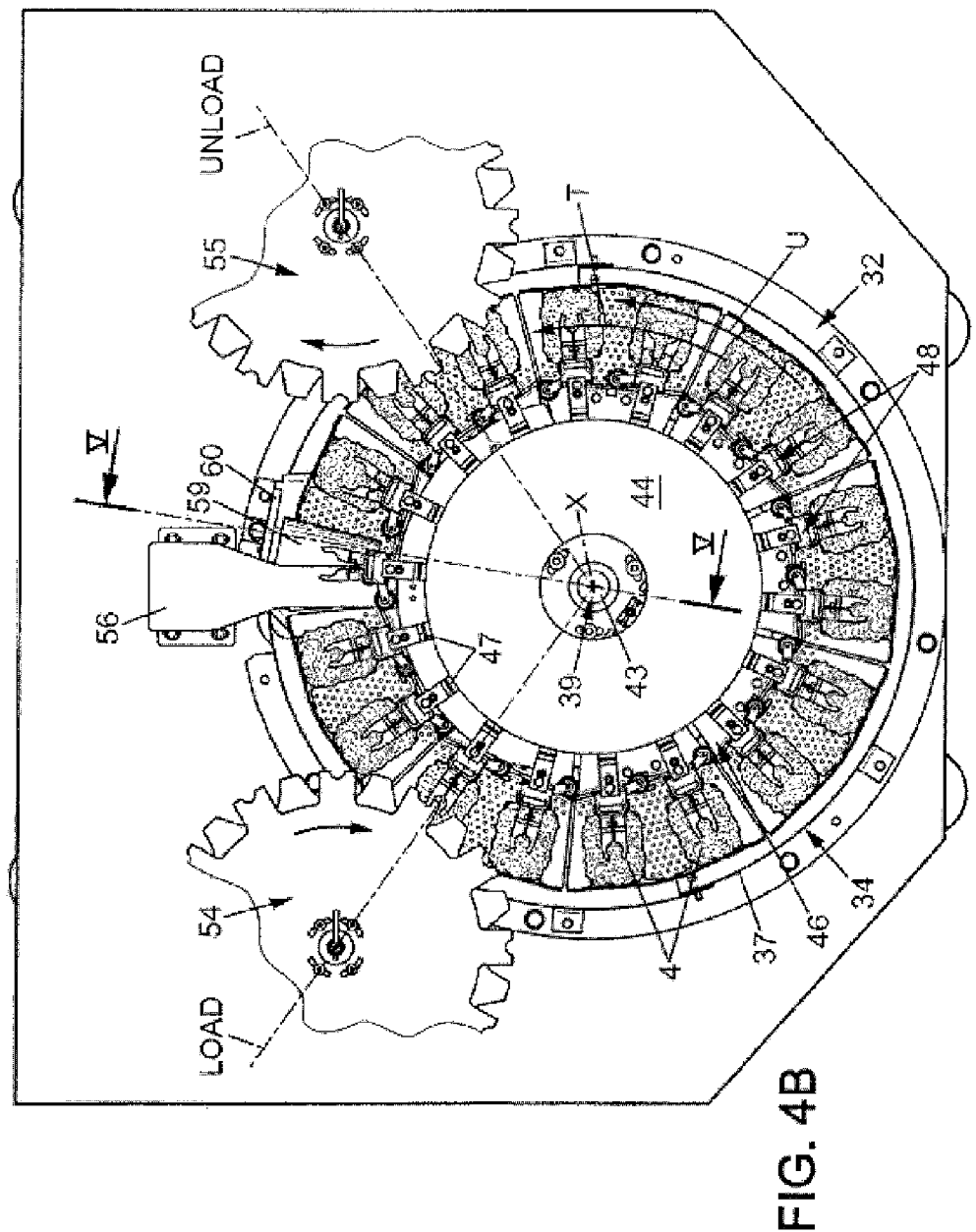

As can be seen in FIGS. 4A and 4B, a carousel type of system according to the invention, rotating around an axis X, is arranged to implement the general aspects described above with respect to FIG. 1F, meaning the containers are vertically displaced to come into contact with spongy masses remaining at a constant level. This system comprises a frame 32 having the general shape of a disk-shaped platform, substantially horizontal and substantially coaxial with the axis X, integral with a substantially vertical tubular sleeve 33 which is coaxial with it.

The frame 32 supports, via a support means 45, a trough or gutter 34 that is substantially annular and substantially coaxial with the axis X, which is delimited by a bottom 35, an annular inner wall 36, and an annular outer wall 37 of a greater height in order to prevent liquid from splattering outside the system. The gutter 32 is rotationally fixed.

Arranged coaxially inside the tubular sleeve 33 is a shaft 39 that is made to rotate between ball bearings 38, its lower end 40 projecting below the frame 32 and supporting a pulley 41 driven by a belt 42 connected to an appropriate driving means (not shown).

At its upper end 43, the shaft 39 supports a disc-shaped drum 44. Attached to the peripheral vertical wall 44a of said drum are substantially vertical rails 47 distributed at a constant angular interval identical to the one mentioned below for the spongy masses 4. The rails 47 support sliding clamping assemblies 48 suitable for gripping the necks 7 of containers 1. The clamping assemblies 48 are made to move on the rails 47 by the action of individual driving means (not visible in FIGS. 4A and 4B) which can be of any appropriate type known to a person skilled in the art; commonly in the field of thermoplastic container manufacturing, these individual driving means can comprise a fixed cam, particularly one arranged on the bottom part of the system, and cam followers supported at the lower end by vertical rods 48a respectively carried by the clamping means 48.

The opening and closing of the clamps of the clamping assemblies 48 can also be controlled by control means comprising a cam and cam followers as is well known to a person skilled in the art (a cam 49 and cam follower 50 are visible in FIG. 4A).

Under these conditions, the containers 1 are conveyed one after the other along a predetermined path T which is substantially an arc of a circle of a predetermined radius as indicated by an arrow in FIG. 4B.

The support means S for the spongy masses 4 comprise a ring 46 substantially coaxial with the axis X which supports a set of spongy masses 4 distributed along its periphery at a constant angular interval. The ring 46 is supported, in a manner that allows it to rotate freely, by the support means 45 for the gutter 34. As an example, the ring is equipped with a skirt or pins (denoted by 51) having roller cam followers 52 on the two opposite sides of a supporting circular plate 53 integral with said support means 45. The ring 46 is also arranged to allow the support rods 48a for the cam followers to slide freely while controlling the vertical displacement of the clamping means 48.

The spongy masses 4 are thus supported in fixed vertical positions relative to the gutter 34.

It should be emphasized that each clamping assembly 48 is vertically aligned with a spongy mass 4, substantially in the median circular cylinder of the gutter 34, indicated by the two axes Y on the right and left in FIGS. 4A and 4B.

Under these conditions, the spongy masses 4 advance one after another along a substantially circular path U (symbolized by an arrow in FIG. 4B) which has a radius substantially equal to said predetermined radius and which runs substantially parallel and substantially coaxially to said predetermined path T of the containers 1, with said spongy masses 4 being moving synchronously in rotation with said containers 1 and underneath the respective end walls 2 of said containers.

The operation of the above system is as follows. As represented in FIG. 4B, an infeed transfer wheel 54 brings the containers 1 to a loading axis LOAD where they are respectively gripped by the clamping means 48 mentioned above. These clamping means are lifted to the raised position by the action of said individual driving means (not shown). The end walls 2 of the containers 1 are then positioned above the respective spongy masses 4, as can be seen in the right portion of FIG. 4A.

The clamping means 48 are then lowered so that the end wall 2 of the containers is forced into contact with the respective spongy masses 4 as can be seen in the left portion of FIG. 4A. Each container is then carried along a major portion of the circular path while in this position, until it reaches an unloading axis UNLOAD where it is gripped by an outfeed transfer wheel 55 (FIG. 4B). Taking into account the time during which the spongy masses 4 and the end walls 2 of the containers 1 are brought into contact and moved apart, the distance D in which contact is maintained as mentioned above is slightly less than the angular distance (in the direction of rotation) between the axes LOAD and UNLOAD.

Drips from compressed spongy masses 4 fall into the gutter 34. An appropriate arrangement of the latter (for example the use of a pump, or more simply a sloped bottom 35) drains out the collected liquid and sends it to a tank (not shown) where it is retreated and/or reprocessed, for example thermally. This drainage then occurs in the angular interval between the loading LOAD and unloading UNLOAD axes mentioned above.

Figure 5:
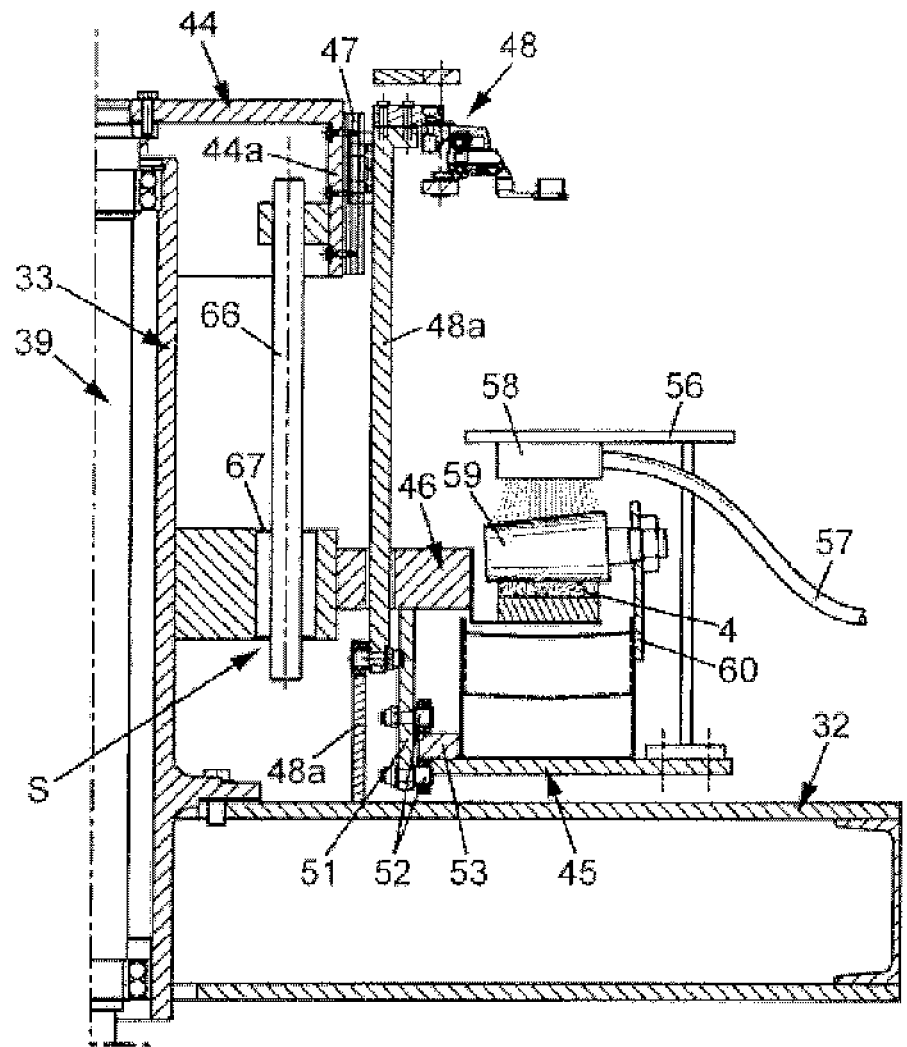
FIG. 5 is a diametric half-view of the system along the line V-V in FIG. 4A, showing details of the embodiment.

The loading of the spongy masses 4 with fresh liquid also occurs within the angular interval between the unloading UNLOAD and loading LOAD axes mentioned above. However, to eliminate the vertical displacement of the spongy masses 4 required by plunging them into a tank as described above, the following arrangement can be used as schematically illustrated in FIG. 5. Within said angular interval (in the direction of rotation) between the loading LOAD and unloading UNLOAD axes, a supporting arm 56 extends radially above the gutter 34, supported in a fixed manner by said support means 45 for the gutter 34. The supporting arm 45 supports at least one supply line 57 which supplies fresh liquid. Said line 57 can be equipped with a nozzle 58 for spraying liquid onto the spongy masses 4 filing beneath it in order to reload them.

It may be advantageous to provide means for wringing the spongy masses 4, immediately upstream from the arm 56, for example in the form of a roller 59 radially positioned to squeeze the spongy masses, and supported, in a manner that allows it to rotate freely, by a flange 60 mounted on the arm 56 or on the outer wall 37 of the gutter 34 as shown in FIGS. 4B and 5.

To expand the domain of uses for the system just described, it is desirable that it be able to handle containers of various shapes, and particularly of various heights. It is, of course, understood that to prevent liquid from spilling or splattering, the end walls of the containers 1 and the respective spongy masses 4 rotate while remaining in the immediate vicinity of the gutter 34.

For this reason, and with the awareness that the clamping means 48 serve as the level of reference for the movement of the containers, it is advantageous to have the assembly of the gutter 34 and the ring 46 carrying the spongy masses 4 be movable. Numerous technical solutions are available to a person skilled in the art.

In the simple exemplary embodiment illustrated in FIG. 4A, the support means 45 for the gutter 34 is in the form of a supporting ring 61 upheld by two columns 62 diametrically opposite each other and able to slide vertically relative to the frame 32. These columns 62 are each integral with a rack and pinion ensemble (not visible) encased in respective fixed housings 63 under the frame 32. An actuating shaft 64 extends diametrically through said housings 63, and has respective cog wheels (not shown) within said housings which mesh with the respective rack and pinion ensembles. An appropriate manual control (for example the crank 65 shown in FIG. 4A) or motorized control adjusts the gutter 34 and the spongy masses to a height appropriate for the height of the containers 1.

Another arrangement can be used (not shown), in which helical cam(s) and follower(s) is/are interposed between the tubular sleeve 33 (or any other part integral with it) and the gutter 34 (or any other part integral with it), to adjust the vertical position of the latter by simple manual or motorized rotation.

For improved guidance during vertical displacement of the ring 46 when adjusting the height of the spongy masses 4, vertically extending guide rods 66 can be provided that are attached above the disc-shaped drum 44 and pass through passages 67 in the ring 46.

In FIG. 4A, the gutter 34 and the spongy masses 4 are arranged in the lowest position in order to treat containers 1 that are large in height. In FIG. 4C which shows the same system (the containers 1 shown on the right and left sides are at the same level, with their respective end walls in contact with the associated spongy masses), the gutter 34 and the spongy masses 4 are in a raised position to allow treating containers that are small in height.

To avoid dirtying the system and for faster availability of the containers at the system point of exit, a drying means for the end walls 2 of the containers can be provided, for example downstream from the supporting arm 56 mentioned above, or even perpendicular to the outfeed transfer wheel 55. These drying means (not represented) can be of any appropriate type known to a person skilled in the art, for example in the form of a wrung-out spongy mass applied to the end walls 2 or a drying jet of gas, particularly air, at an appropriate temperature.

A carousel-type system of the invention, rotating around an axis X, is arranged in FIG. 6 to implement the general aspects described above with reference to FIG. 1D, or in other words so that the spongy masses are vertically displaced to come into contact with the containers while the latter remain at a constant level. The system illustrated in FIG. 6 has much the same structure as the system in FIGS. 4A-4C, and the same numerical references are used to denote the same units or parts.

Due to the fact that the containers 1 are conveyed at a substantially constant level, in this case the clamping means 48 is attached directly to the disc-shaped drum 44.

As for the support means S for the spongy masses 4, the ring 46 is reduced to the central part of the ring 46 in FIGS. 4A-4C, although it retains the same structure and functions: it is equipped with roller cam followers 52 cooperating with the circular support plate 53 and is vertically guided by the rods 66 passing through the passages 67 as explained above. At its outside edge, the ring 46 upholds, by means of vertical rails 68, some supports 69 to which the spongy masses 4 are solidly attached. The number of these supports 69 is equal to that of the spongy masses 4. Each support 69 is equipped with a cam follower that cooperates with a guide cam (not visible in FIG. 6) to control the vertical movement of the spongy masses 4; the cam follower can be supported at the lower end of a support arm 70, extending downwards and attached to the respective support 69.

In the right portion of FIG. 6 (loading/unloading the container 1), the support 69 and the spongy mass 4 are maintained in the lowered position by the cam follower bearing against the guide cam; due to this, the spongy mass 4 is moved vertically downwards, away from the end wall 2 of the corresponding container 1.

In the left portion of FIG. 6 (applying liquid to the end wall 2 of the container 1), the support 69 is held in the raised position by the cam follower bearing against the guide cam; due to this, the spongy mass 4 is also in the raised position and is held in close contact with the end wall 2 of the container 1.

The rotating systems just presented can receive many supplemental improvements such as those described above for examples of linearly advancing systems.

Of course, many variations of the system embodiments just described can be introduced as needed, without going beyond the scope of the invention defined in the following claims.

The invention claimed is:

1. A method for applying a fluid onto an end wall of at least one container of thermoplastic material, comprising:
    contacting the end wall of said at least one container with a spongy mass saturated with the fluid, for a predetermined period, while the container is conveyed along a predetermined path,
    conveying the container along the predetermined path by conveying means engaged around a neck of the container, and advancing the spongy mass at a same speed as the container along a path substantially parallel to the predetermined path of the container while simultaneously being in contact with the end wall of the container during said predetermined period.

2. The method according to claim 1, wherein, in order to process a multiplicity of containers advancing one after another along a substantially rectilinear path, the spongy mass is in the form of an endless strip comprising at least one working side extending substantially parallel to said path of the containers and moving synchronously in rotation with the movement speed of the succession of containers, the containers are moved so that their respective end walls are brought into contact with said working side of the endless strip formed by the spongy mass, and resaturating the endless strip formed by the spongy mass with fresh fluid when the endless strip stops contacting with the container end walls.

3. The method according to claim 1, wherein, in order to process a multiplicity of containers advancing one after another along a path that is substantially an arc of a circle of a predetermined radius, a plurality of spongy masses are provided, which are respectively positioned underneath said containers and advance one after another along a substantially circular path having a radius substantially equal to said predetermined radius and extending substantially parallel and substantially coaxially to said path of the containers, moving said spongy masses synchronously in rotation with said containers and underneath the respective end walls of said containers, when the containers arrive at the start of the path, bringing the end walls of the containers and the respective spongy masses closer together so that said end walls are in contact with the respective spongy masses, when the containers arrive at the end of the path, separating the end walls of the containers and the respective spongy masses, and when the spongy masses are no longer in contact with the end walls of containers, resaturating the spongy masses with fresh fluid, said saturation with fresh fluid occurring during the angular travel of the spongy masses between the end of the travel of the containers along the path and the start of the travel of the containers along the path.

4. The method according to claim 1, wherein a temperature of the fresh fluid is regulated.

5. The method according to claim 1, wherein the fluid is a liquid and wherein, when the spongy mass is no longer in contact with the end wall of the container, wringing out and resaturating the spongy mass with fresh liquid before bringing the spongy mass in contact with an end wall of another container.

6. The method according to claim 1, wherein the fluid is a liquid, and recovering the liquid that escapes from the spongy mass when the spongy mass is being pressed against the end walls of the containers and/or when wringing out the spongy mass, and returning the recovered liquid to the reserve of fresh liquid, after processing if processing is performed.

7. The method according to claim 1, wherein, after contacting the fluid to the end wall of the container and moving said spongy mass from said end wall, at least partially drying a surface of said end wall dried.

8. The method according to claim 1, further comprising:
rapidly modifying the temperature of the end wall of the at least one container of thermoplastic material, by saturating said spongy mass that is brought into contact with the end wall of at least one container with a heat transfer fluid which is held in contact with said end wall for a predetermined period.

9. The method according to claim 1, further comprising:
rapidly cooling the end wall of the at least one container of thermoplastic material which is leaving a blow molding or stretch-blow molding unit, by saturating said spongy mass that is brought into contact with the end wall of said at least one container with a heat transfer fluid of a temperature lower than that of said end wall, and is maintained in contact with said end wall for a predetermined period.

10. The method according to claim 1, wherein the end wall of the at least one container of thermoplastic material, which the spongy mass contacts, is a bottom end wall of the at least one container of thermoplastic material.

11. The method according to claim 1, wherein the end wall of the at least one container of thermoplastic material, which is contacted by the spongy mass, is disposed perpendicular to a longitudinal axis of the container.

* * * * *